United States Patent
Song

(10) Patent No.: US 8,738,808 B2
(45) Date of Patent: May 27, 2014

(54) PLC SYSTEM

(75) Inventor: Dong Shin Song, Anyang (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 198 days.

(21) Appl. No.: 13/241,129

(22) Filed: Sep. 22, 2011

(65) Prior Publication Data

US 2012/0130512 A1 May 24, 2012

(30) Foreign Application Priority Data

Nov. 22, 2010 (KR) .................. 10-2010-0116407

(51) Int. Cl.
*G06F 3/00* (2006.01)

(52) U.S. Cl.
USPC .............................................. 710/2

(58) Field of Classification Search
CPC ............... G05B 19/054; G05B 2219/1109; G05B 2219/15072; G05B 2219/33226
See application file for complete search history.

(56) References Cited

U.S. PATENT DOCUMENTS

| | | | |
|---|---|---|---|
| 6,912,678 B1* | 6/2005 | Floro et al. | 714/724 |
| 2007/0055388 A1* | 3/2007 | Araki et al. | 700/18 |
| 2008/0133789 A1* | 6/2008 | McNutt et al. | 710/30 |
| 2011/0060826 A1* | 3/2011 | Reister et al. | 709/224 |

FOREIGN PATENT DOCUMENTS

| | | |
|---|---|---|
| CN | 1171851 | 1/1998 |
| CN | 1353828 | 6/2002 |
| CN | 2842506 | 11/2006 |
| CN | 101592934 | 12/2009 |
| JP | 2002-062908 | 2/2002 |
| JP | 2007-079731 | 3/2007 |
| JP | 2008-077265 | 4/2008 |
| JP | 2009-223398 | 10/2009 |
| JP | 2010-257194 | 11/2010 |

* cited by examiner

*Primary Examiner* — Ernest Unelus
*Assistant Examiner* — Ronald Modo
(74) *Attorney, Agent, or Firm* — Lee, Hong, Degerman, Kang & Waimey

(57) ABSTRACT

Disclosed is a PLC system, the PLC system including a remote I/O module and an extended I/O module, thus configuring a ring topology with the remote I/O module and the extended I/O module.

5 Claims, 5 Drawing Sheets

PLC SYSTEM

Pursuant to 35 U.S.C. §119(a), application claims the benefit of earlier filing date and right of priority to Korean Patent Application No. 10-2010-0116407, filed Nov. 22, 2010, the contents of which is hereby incorporated by reference herein in its entirety.

FIELD OF THE DISCLOSURE

The present invention relates to a PLC system.

DISCUSSION OF THE RELATED ART

Automated equipment used in traditional industrial settings comprises mechanical equipment using a relay and other devices. In order to functionally change the automated equipment comprising the mechanical equipment, there is a difficulty in correcting wires of an internal circuit of the equipment one by one. In order to solve the problem, a programmable logic controller (PLC) has been proposed.

The PLC usually performs the same role as that of a computer, and is configured to receive a signal from the equipment, process the signal according to contents programmed therein, and then output the processed signal to the equipment. Further, the PLC substitutes a function of a control unit such as a relay, a timer, and a counter with a semiconductor device such as an integrated device and a transistor. The PLC adds a numeric calculating function to a basic sequence control function to control a program, and executes a predetermined logic according to a program previously stored in an internal memory.

As described above, the PLC requires a larger number of I/O contact points to integrate various kinds of devices into one system. However, a block type PLC is problematic in that the number of permissible I/O contact points is limited because of several restrictions including a size of the PLC.

In order to solve the problem, there has been proposed a method of additionally connecting an I/O module to the block type PLC. That is, the I/O module is directly connected to a data line of the PLC through the connection terminal, thus extending the I/O contact point of the PLC.

However, this method is also problematic in that the I/O module is directly connected to the data line of the PLC, so that external noise is applied to thereby negatively affect a performance of the entire PLC system. Further, as the I/O module is directly connected to the data line of the PLC, the data line of the PLC increases in length. As the number of connected I/O modules increases, the performance of the data line is deteriorated. Further, if the I/O module is directly connected to the data line of the PLC, a transmission speed of data and signal is undesirably reduced.

SUMMARY OF THE DISCLOSURE

Accordingly, an object of the present invention is to provide a PLC system capable of extending the number of I/O contact points of a PLC by combining a method of directly connecting an I/O module to the PLC and a method of connecting a remote I/O module to the PLC using a network.

In one general aspect of the present invention, there is provided a PLC system, the PLC system comprising a PLC including a first I/O terminal for inputting and outputting data; a remote I/O module including a second I/O terminal and communicating with the PLC to input or output the data of the PLC through the second I/O terminal; and an extended I/O module including a third I/O terminal, and mounted to the PLC to transceive the data of the PLC through the third I/O terminal and thereby extend an input and output range of the data.

Preferably, in an embodiment of the present invention, the PLC comprises a first communication unit for communicating with the remote I/O module and the extended I/O module; first and second switching units for performing switching operation to communicate with either or both of the remote I/O module and the extended I/O module; and a first control unit for generating a control signal to perform the switching operation of the first and second switching units.

Preferably, in an embodiment of the present invention, the PLC comprises a third switching unit for performing switching operation to configure a ring topology with the remote I/O module and the extended I/O module.

Preferably, in an embodiment of the present invention, the remote I/O module comprises a second communication unit for transceiving the data of the PLC through a predetermined communication line between the remote I/O module and the PLC, thus inputting and outputting the data of the PLC through the second I/O terminal.

Preferably, in an embodiment of the present invention, the extended I/O module comprises a third communication unit for transceiving the data from the PLC; and a fourth switching unit for performing switching operation to additionally connect the extended I/O module.

Preferably, in an embodiment of the present invention, the PLC includes a plurality of first connection terminals, each of the first connection terminals being depressed in a predetermined portion thereof to mount the extended I/O module thereto.

Preferably, in an embodiment of the present invention, the extended I/O module includes a plurality of second connection terminals at positions corresponding to those of the first connection terminals, each of the second connection terminals protruding at a predetermined portion thereof to be mounted to the first connection terminal.

Preferably, in an embodiment of the present invention, the PLC includes a plurality of first communication terminals connected to the communication line to communicate with the remote I/O module.

Preferably, in an embodiment of the present invention, the remote I/O module includes a plurality of second communication terminals connected to the communication line to communicate with the PLC.

The PLC system according to the present invention configured as described above has the following advantages.

First, the PLC system is advantageous in that it enhances reliability of data transmission, and its data transmission speed is faster than that of a conventional data line. Thereby, vulnerability to noise can be reduced.

Second, the PLC system is advantageous in that it is possible to increase the number of mountable I/O modules, which was limited because of a length of data line, vulnerability to noise, and a memory capacity.

Third, the PLC system is advantageous in that an I/O module directly connected to a PLC and a remote I/O module are combined via a ring topology, so that the PLC system can be normally operated even if only one terminal is disconnected.

Fourth, the PLC system is advantageous in that a ring topology is automatically configured by switches that are installed in a PLC and an I/O module, so that additional wiring or connection setup is not required to extend an I/O contact point. Further, the I/O contact point can be extended and simultaneously the ring topology can be configured simply by mounting the I/O module to the PLC. The more complicated the system is, the greater the effect is.

Fifth, the PLC system is advantageous in that a PLC and an I/O module may be mounted without incurring additional cable cost.

DETAILED DESCRIPTION OF PREFERRED EMBODIMENTS

Figure 1:
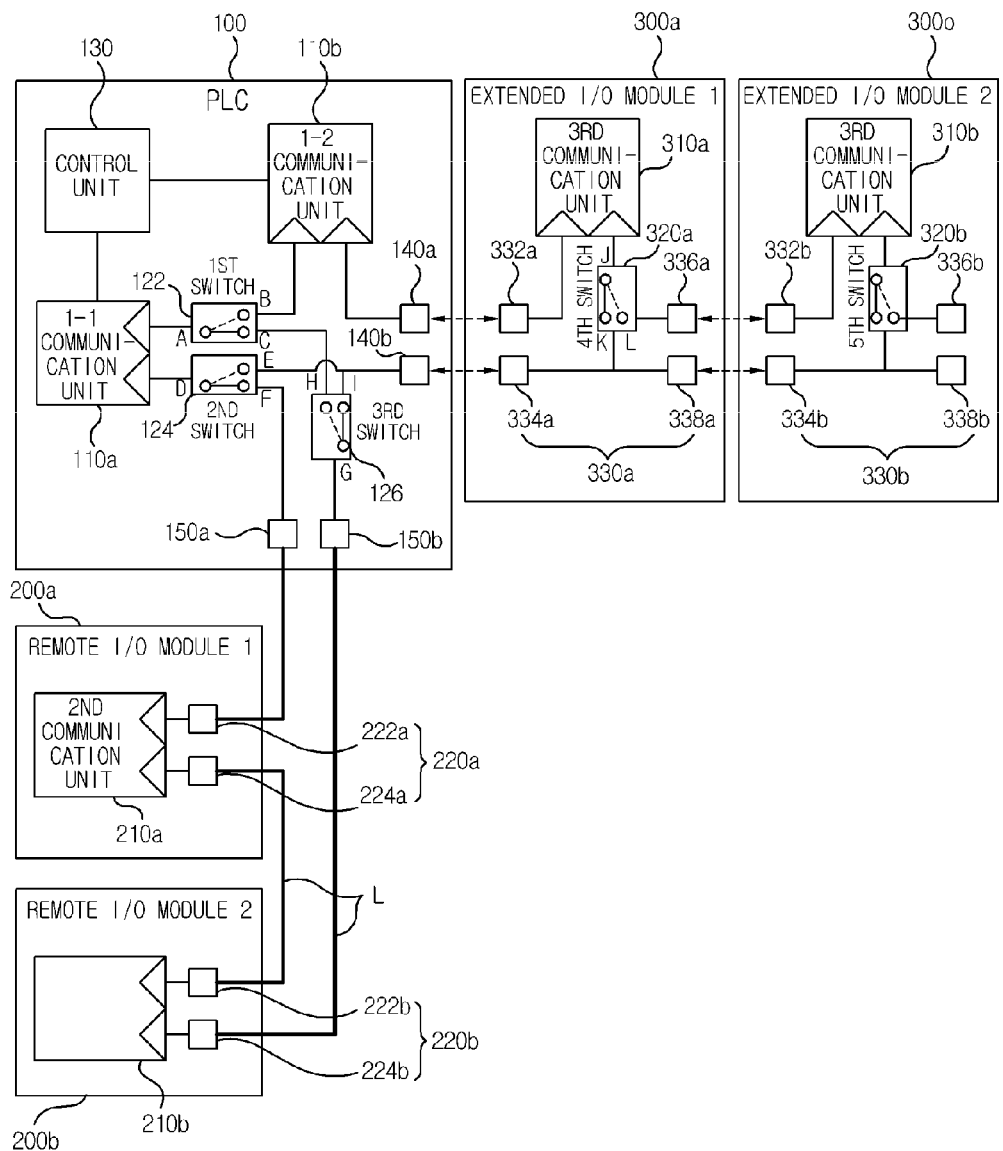
FIG. 1 is a diagram illustrating a configuration of a PLC system in accordance with a preferred embodiment of the present invention.

Since the present invention may be variously changed and include several embodiments, particular embodiments shown in the drawings will be described in detail in the detailed description.

However, it is to be understood that the invention is not limited to the particular embodiments, and various changes, equivalences and substitutions may be made without departing from the scope and spirit of the invention.

Although the terms "first", "second", etc. are used herein to describe various components, these components should not be limited by these terms.

These terms are only used to distinguish one component from another component. For example, the second component may be designated as the first component without departing from the scope of the invention. Similarly, the first component may be designated as the second component.

Further, when the term "couple" or "connect" is used in the specification or claims, it is intended to means not only "directly coupled or connected to" but also "indirectly coupled or connected to" such as connected through another component or components. In contrast, the term "directly coupled or connected to" means that there is no component between the coupled or connected components.

Also it is to be understood that terms employed herein are for the purpose of description of particular embodiments and not of limitation. Further, the singular forms "a" and "an" include plural referents unless the context clearly dictates otherwise.

Furthermore, it should be understood that terms "include" or "have" are inclusive of characteristics, numerals, steps, operations, components, parts or combination thereof, which are described herein, but are not exclusive of one or more different characteristics, numerals, steps, operations, components, parts or combination thereof.

For clarity and convenience of description, the size or shape of components shown in the drawings may not be illustrated to scale.

Hereinafter, the present invention will be described in detail with reference to the accompanying drawings, and the same reference numerals will be used to refer to the same components throughout the specification, and a duplicated description thereof will be omitted.

Figure 2:
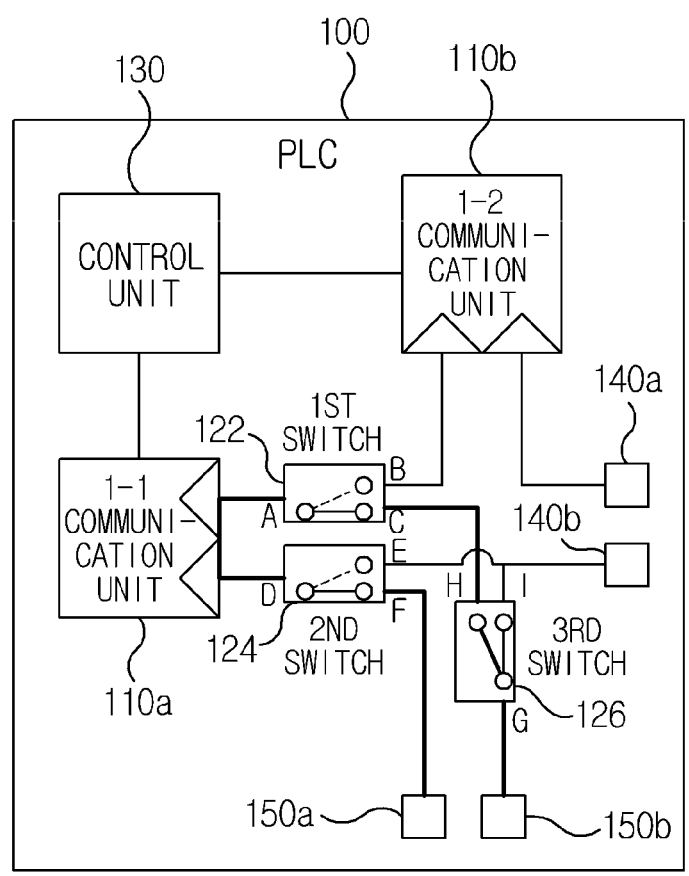
FIG. 2 is a diagram illustrating operation of a switching unit when only a PLC of FIG. 1 is individually operated.
Figure 3:
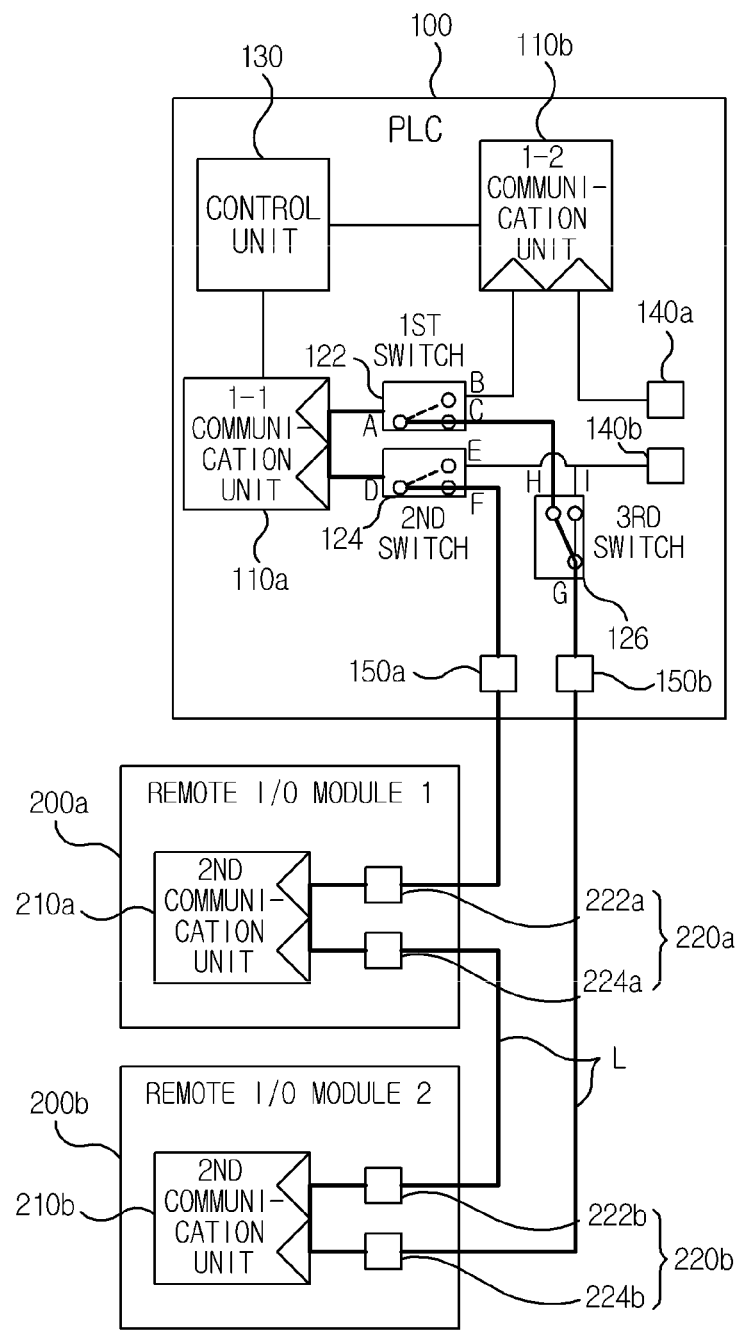
FIG. 3 is a diagram illustrating a data communication path between the PLC and a remote I/O module in accordance with a preferred embodiment of the present invention.

FIG. 1 is a diagram illustrating a configuration of a PLC system in accordance with a preferred embodiment of the present invention, FIG. 2 is a diagram illustrating operation of a switching unit when only a PLC of FIG. 1 is individually operated, and FIG. 3 is a diagram illustrating a data communication path between the PLC and a remote I/O module in accordance with a preferred embodiment of the present invention.

As shown in FIG. 1, a PLC system according to an embodiment of the present invention includes a programmable logic controller (PLC) 100, a remote I/O module 200, and an extended I/O module 300.

The PLC 100 according to an embodiment of the present invention is a block type PLC capable of inputting and outputting data, and includes a first communication unit 110, first to third switching units 122, 124 and 126, a first control unit 130, a first connection terminal 140, and a first communication terminal 150.

The first communication unit 110 communicates with the remote I/O module 200 and the extended I/O module 300. The first communication unit 110 performs communication according to a predetermined communication protocol, and reduces interference such as noise via an error correcting code such as a cyclic redundancy check (CRC) included in the communication protocol, thus increasing data reliability.

The first and second switching units 122 and 124 perform switching operation to communicate with either or both of the remote I/O module 200 and the extended I/O module 300. The third switching unit 126 performs switching operation to configure a ring topology with the remote I/O module 200 or the extended I/O module 300.

To be more specific, referring to FIGS. 2 and 3, when A-C terminals of the first switching unit 122 and D-F terminals of the second switching unit and 124 are connected depending on a state of the first communication terminal 150, and G-H terminals of the third switching unit 126 are connected the PLC 100 and the remote I/O module 200 automatically configure the ring topology, thus enabling data communication through a communication line L connected between the first communication terminal 150 and a second communication terminal 220.

That is, after it is determined whether the extended I/O module 300 is mounted, the first and third switching units 122 and 126 are operated in response to a determined result. Further, after the state of the first communication terminal 150 is determined, the second switching unit 124 is operated in response to a determined result. The first to third switching units 122, 124 and 126 performing switching operation depending on the state of the mounted module automatically configure the ring topology.

The first control unit 130 functions to control entire operation of the PLC 100. That is, the control unit 130 controls the PLC 100, performs calculating operation of the PLC 100, and generates a signal for performing the switching operation of the first and second switching units 122 and 124.

The first connection terminal 140 includes a plurality of connection terminals, and is depressed at a predetermined portion thereof to mount the extended I/O module 300 thereto.

The first communication terminal 150 includes a plurality of communication terminals, and is connected to the communication line L to communicate with the remote I/O module 200.

The remote I/O module 200 includes a second I/O terminal, and communicates with the PLC 100 to input and output data of the PLC 100 via the second I/O terminal.

Such a remote I/O module 200 includes a second communication unit 210 and a second communication terminal 220. The second communication unit 210 transceives data with the PLC 100 via the communication line L, thus inputting and outputting the data of the PLC 100 via the second I/O terminal.

The second communication terminal 220 includes a plurality of communication terminals, and is connected to the communication line L to communicate with the PLC 100.

Figure 4:
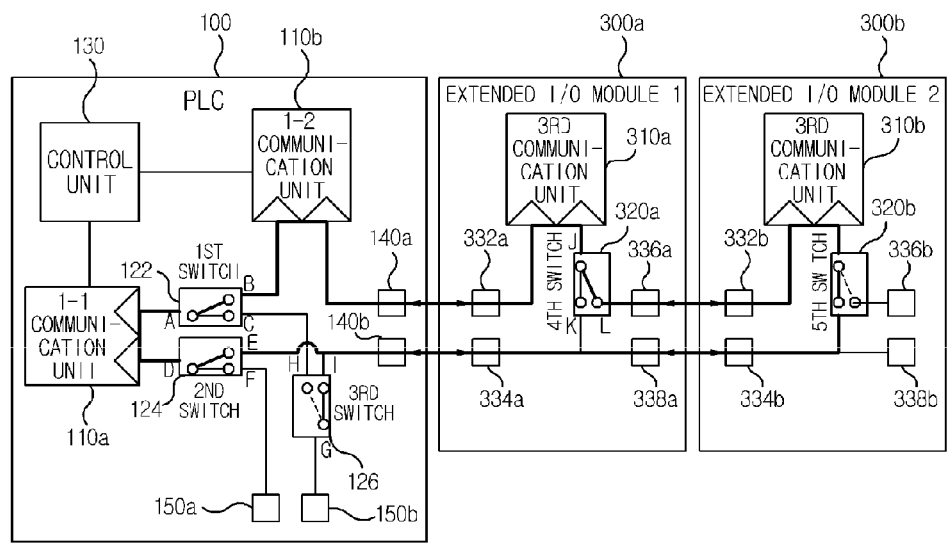
FIG. 4 is a diagram illustrating a data communication path between the PLC and an extended I/O module in accordance with a preferred embodiment of the present invention.
Figure 5:
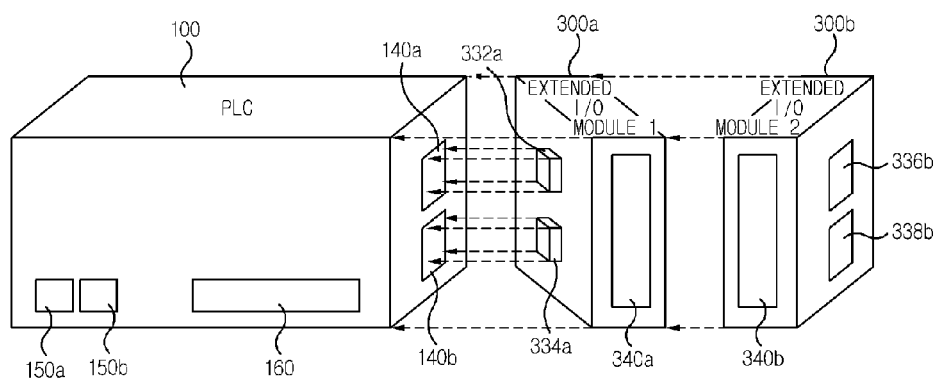
FIG. 5 is a diagram illustrating the mounting of the extended I/O module to the PLC in accordance with a preferred embodiment of the present invention.

FIG. 4 is a diagram illustrating a data communication path between the PLC and the extended I/O module in accordance with a preferred embodiment of the present invention, and FIG. 5 is a diagram illustrating the mounting of the extended I/O module to the PLC in accordance with a preferred embodiment of the present invention.

Referring to FIGS. 4 and 5, the extended I/O module 300 comprises a third I/O terminal 340, and is mounted to the PLC 100 to transceive data of the PLC 100 via the third I/O terminal 340, thus extending an input and output range of data.

In order to perform the above-mentioned operation, the extended I/O module 300 comprises a third communication unit 310, a fourth switching unit 320, and a second connection terminal 330.

The third communication unit 310 transceives data of the PLC 100 via the first connection terminal 140 of the PLC 100.

The fourth switching unit 320 performs switching operation to additionally connect the extended I/O module 300. That is, the fourth switching unit 320 performs switching operation depending on whether the extended I/O module 300 is additionally mounted, thus enabling a communication network to be configured merely by mounting without additional operation.

The switching operation of each of the first to fourth switching units 122, 124, 126, and 320 are shown in Tables 1 to 4.

TABLE 1

Operation of First Switching Unit

| 1st Switching Unit 122 | | Remote I/O Module | |
|---|---|---|---|
| | | Mounted | Non-Mounted |
| Extended I/O Module | Mounted | A-B connected | A-B connected |
| | Non-Mounted | A-C connected | A-C connected |

TABLE 2

Operation of Second Switching Unit

| 2nd Switching Unit 124 | | Remote I/O Module | |
|---|---|---|---|
| | | Mounted | Non-Mounted |
| Extended I/O module | Mounted | D-F connected | D-E connected |
| | Non-Mounted | D-F connected | D-F connected |

TABLE 3

Operation of Third Switching Unit

| 3rd Switching Unit 126 | | Remote I/O Module | |
|---|---|---|---|
| | | Mounted | Non-Mounted |
| Extended I/O module | Mounted | G-I connected | G-H connected |
| | Non-Mounted | G-H connected | G-H connected |

TABLE 4

Operation of Fourth Switching Unit

| 4th Switching Unit 320 | Additional Extended Module | |
|---|---|---|
| | Mounted | Non-Mounted |
| | J-L connected | J-K connected |

The second connection terminal 330 includes a plurality of terminals, and a predetermined portion thereof corresponding to the first connection terminal 140 protrudes to be mounted to the first connection terminal 140. The data of the PLC 100 is transceived with the extended I/O module 300 via the second connection terminal 330, thus resulting in an increase in the number of I/O terminals of the PLC 100.

Figure 6:
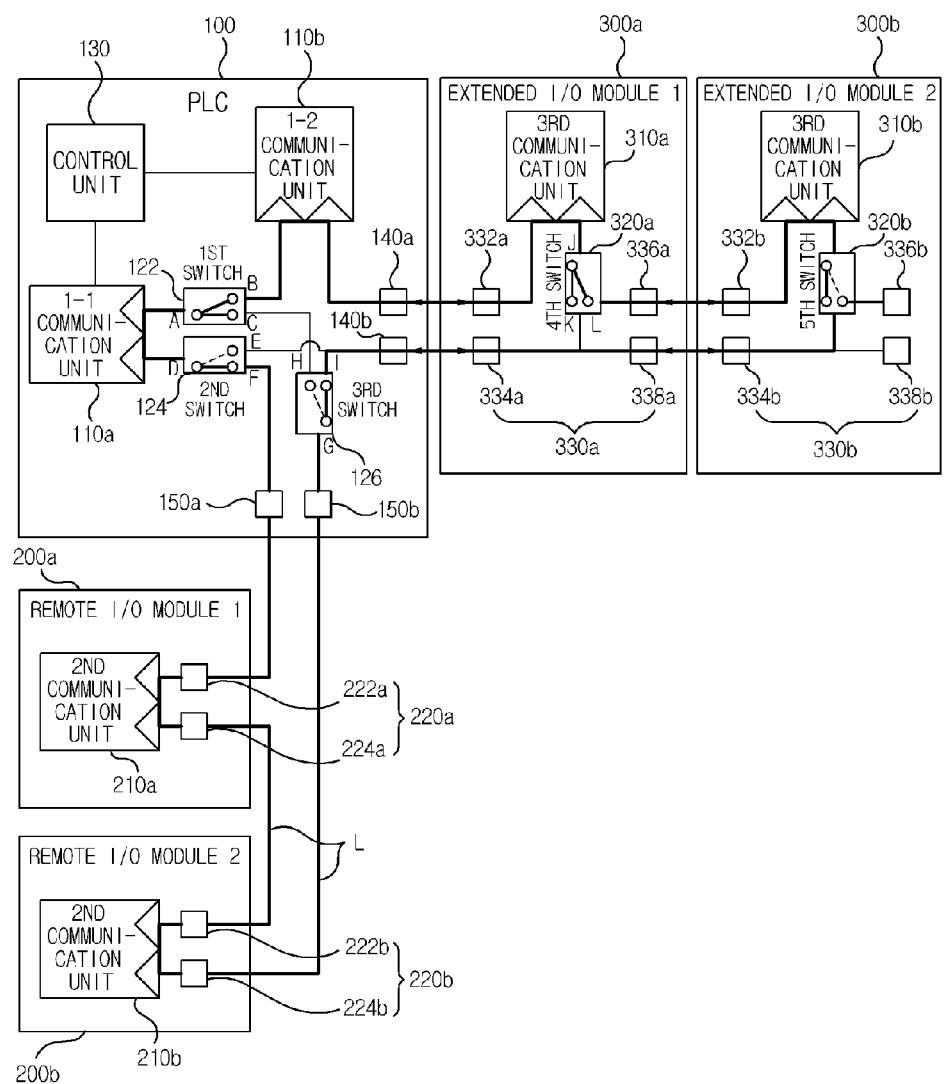
FIG. 6 is a diagram illustrating data communication paths between the PLC, the remote I/O module and the extended I/O module in accordance with a preferred embodiment of the present invention.

FIG. 6 is a diagram illustrating data communication paths between the PLC, the remote I/O module and the extended I/O module in accordance with a preferred embodiment of the present invention. The above-mentioned configuration and operation will be summarized with reference to FIG. 6. That is, the PLC 100 may extend the I/O terminal using two methods. One of the methods is to extend the I/O terminal by communicating with the remote I/O module 200 through the communication line L. The other is to extend the I/O terminal by directly mounting the extended I/O module 300 to the PLC 100.

To this end, the first to third switching units 122, 124 and 126 provided in the PLC 100 perform switching operation depending on the connected states of the remote I/O module 200 and the extended I/O module 300, thus configuring the ring topology in one communication network. The advantageous of present invention is as follows:

First, such a configuration allows connection using the third communication unit 310 of the extended I/O module 300 when the I/O terminal of the PLC 100 is extended, thus improving a transmission speed and stability. Further, since data transmission is performed by the means such as the CRC included in the predetermined communication protocol, data reliability can be enhanced and a faster transmission speed is achieved in comparison with a conventional configuration of exchanging data using a data line.

Second, it is possible to increase the number of mountable extended I/O modules, which was limited because of a length of data line, vulnerability to noise, and a memory capacity. Even though there is difference according to the communication protocol, it is unnecessary to consider a distance limit in the case of performing mounting operation using a connection terminal, because the PLC system of this invention may be used at a very long distance. Further, in the case of making connection through communication, vulnerability to noise can be also reduced as described above. Furthermore, in the case of using communication, a limited memory is irrelevant to the memory capacity of the PLC because a control operation is not directly performed by the PLC. Thus, the number of mountable extended I/O module can be increased in comparison with a conventional method.

A third effect is achieved by the configuration of the ring topology. The ring topology is characterized in that, even if one of several communication lines of a communication network is disconnected, the ring topology becomes a linear topology, so that the entire communication network can be normally operated. That is, as for the conventional system, even if only one line is disconnected by contact failure of a connection terminal, all extended I/O modules mounted later may malfunction. In contrast, as for the system of this invention, even if one line is disconnected, the entire system as well as the mounted extended I/O modules is normally operated.

Fourth, the ring topology is automatically configured by switches that are installed in the block type PLC and the extended I/O module. Thus, additional wiring or connection setup is not required to extend the I/O contact point. Further, the I/O contact point can be extended and simultaneously the ring topology can be configured simply by mounting the extended I/O module to the connection terminal of the block type PLC. The more complicated the system is, the greater the effect is.

Fifth, the block type PLC and the extended I/O module do not require an additional communication cable, and are configured to be directly connected via the communication connection terminal. Thus, a mounting operation is possible without incurring additional cable cost.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A programmable logic controller (PLC) system comprising:
    a PLC including a first connection terminal connected to an extended input/output (I/O) module, and a first communication terminal connected to a communication line to a remote I/O module;
    the remote I/O module including a second communication terminal, and configured to communicate data of the PLC with the PLC through the first and second communication terminals; and
    the extended I/O module including a second connection terminal, and mounted to the PLC to communicate the data of the PLC through the first and second connection terminals,
    wherein the PLC comprises:
        a first communication unit configured to communicate with the remote I/O module,
        a second communication unit configured to communicate with the extended I/O module,
        first and second switching units configured to perform switching operation to communicate with either or both of the remote I/O module and the extended I/O module,
        a third switching unit configured to perform a switching operation to configure a ring topology with the remote I/O module and the extended I/O module, and
        a first control unit configured to control the first, second, and third switching units.

2. The system as set forth in claim 1, wherein the remote I/O module comprises:
    a second communication unit configured to communicate the data of the PLC with the PLC through the communication line.

3. The system as set forth in claim 1, wherein the extended I/O module comprises:
    a third communication unit configured to communicate the data of the PLC with the PLC; and
    a fourth switching unit configured to perform a switching operation to additionally connect the extended I/O module.

4. The system as set forth in claim 1, wherein the first connection terminal is depressed in a predetermined portion of the PLC to mount the extended I/O module thereto.

5. The system as set forth in claim 4, wherein the second connection terminal protrudes at a predetermined portion of the extended I/O module to be mounted to the first connection terminal.

* * * * *